US009652382B1

(12) United States Patent
Subramanian et al.

(10) Patent No.: US 9,652,382 B1
(45) Date of Patent: May 16, 2017

(54) LOOK-AHEAD GARBAGE COLLECTION FOR NAND FLASH BASED STORAGE

(71) Applicant: SK hynix memory solutions inc., San Jose, CA (US)

(72) Inventors: Arunkumar Subramanian, San Jose, CA (US); Zheng Wu, San Jose, CA (US)

(73) Assignee: SK Hynix Memory Solutions Inc., San Jose, CA (US)

( * ) Notice: Subject to any disclaimer, the term of this patent is extended or adjusted under 35 U.S.C. 154(b) by 79 days.

(21) Appl. No.: 14/829,524

(22) Filed: Aug. 18, 2015

Related U.S. Application Data

(60) Provisional application No. 62/045,925, filed on Sep. 4, 2014, provisional application No. 62/066,224, filed on Oct. 20, 2014.

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0652* (2013.01); *G06F 3/0679* (2013.01); *G06F 2212/1044* (2013.01); *G06F 2212/2022* (2013.01)

(58) Field of Classification Search
CPC ....... G06F 2212/702; G06F 2212/7205; G06F 12/0253–12/0276
See application file for complete search history.

(56) References Cited

U.S. PATENT DOCUMENTS

| 7,409,489 | B2* | 8/2008 | Sinclair | G06F 3/0605 365/185.11 |
| 7,624,137 | B2* | 11/2009 | Bacon | G06F 12/0253 |
| 9,411,718 | B2* | 8/2016 | Cohen | G06F 12/0246 |
| 2007/0033376 | A1* | 2/2007 | Sinclair | G06F 3/0605 711/203 |
| 2011/0055455 | A1* | 3/2011 | Post | G06F 12/0246 711/103 |
| 2011/0202578 | A1* | 8/2011 | Asano | G06F 12/0246 707/813 |
| 2012/0191936 | A1* | 7/2012 | Ebsen | G06F 12/0253 711/170 |
| 2012/0278530 | A1* | 11/2012 | Ebsen | G06F 3/0659 711/103 |
| 2013/0198438 | A1* | 8/2013 | Masuo | G06F 12/0246 711/103 |

(Continued)

*Primary Examiner* — Sean D Rossiter
*Assistant Examiner* — Khoa D Doan
(74) *Attorney, Agent, or Firm* — IP & T Group LLP

(57) ABSTRACT

One or more source locations in a group of solid state storage cells on which garbage collection is to be performed are stored in a garbage collection queue. A garbage collection speed is determined, including by: analyzing one or more source locations stored in the garbage collection queue; determining a look-ahead metric, wherein the look-ahead metric comprises an anticipated amount of freed up storage associated with the analyzed source locations; and determining the garbage collection speed based at least in part on the look-ahead metric. One or more garbage collection operations are performed interleaved with one or more host operations, wherein the ratio of garbage collection operations to host operations is based at least in part on the garbage collection speed.

20 Claims, 9 Drawing Sheets

(56) References Cited

U.S. PATENT DOCUMENTS

| | | | |
|---|---|---|---|
| 2014/0032820 A1* | 1/2014 | Harasawa | G06F 12/0246 |
| | | | 711/103 |
| 2014/0101379 A1* | 4/2014 | Tomlin | G06F 3/0608 |
| | | | 711/103 |
| 2014/0281127 A1* | 9/2014 | Marcu | G06F 12/0246 |
| | | | 711/103 |
| 2015/0026694 A1* | 1/2015 | Akiyama | G06F 12/0261 |
| | | | 719/103 |
| 2015/0277785 A1* | 10/2015 | Liang | G06F 12/0246 |
| | | | 711/103 |
| 2016/0077745 A1* | 3/2016 | Patel | G06F 3/0608 |
| | | | 714/704 |
| 2016/0232088 A1* | 8/2016 | Mohan | G06F 12/0253 |

\* cited by examiner

US 9,652,382 B1

LOOK-AHEAD GARBAGE COLLECTION FOR NAND FLASH BASED STORAGE

CROSS REFERENCE TO OTHER APPLICATIONS

This application claims priority to U.S. Provisional Patent Application No. 62/045,925 entitled LOOK-AHEAD GARBAGE COLLECTION FOR NAND FLASH BASED STORAGE filed Sep. 4, 2014 which is incorporated herein by reference for all purposes. This application claims priority to U.S. Provisional Patent Application No. 62/066,224 entitled LOOK-AHEAD GARBAGE COLLECTION FOR NAND FLASH BASED STORAGE filed Oct. 20, 2014 which is incorporated herein by reference for all purposes.

BACKGROUND OF THE INVENTION

Solid state storage cells, including NAND flash memories, are increasingly gaining market share in both enterprise and consumer data storage solutions. They are resilient to shock and their I/O performance is better than that of conventional hard disk drives. A NAND flash memory is divided into many blocks and each block is divided into many pages. A page contains data for multiple logic block addresses (LBAs), which are the smallest memory unit that can be accessed by the host device.

Unlike dynamic random access memory (DRAM) and/or magnetic storage drives, NAND flash memories do not support in-place updates. Because of this, a garbage collection operation is used to keep storage efficient. The garbage collection operation needs to be scheduled efficiently to keep the storage device efficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Background

Figure 1:
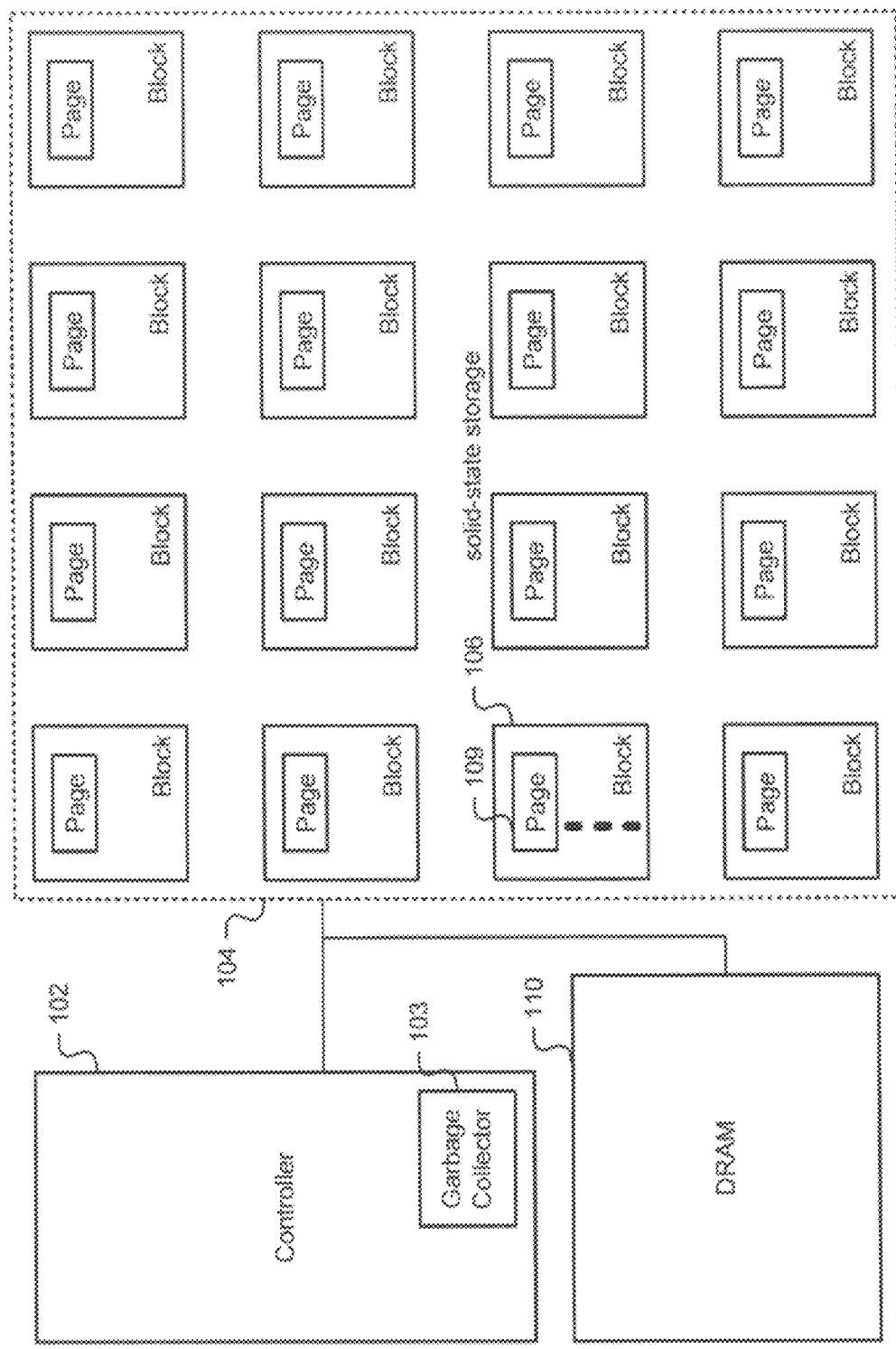
FIG. 1 is an illustration of a NAND flash storage device.

FIG. 1 is an illustration of a NAND flash storage device. A NAND flash storage device consists of one or more NAND flash chips or dies (104) and a controller chip (102). A NAND flash chip is divided into blocks (106), which are subdivided into pages (109). Data can be written to the NAND flash one entire page (109) at a time, and in some cases, a specified fraction of a page at a time. A page (109) must be in an erased state before it can be written. It is not possible to erase individual pages; rather, an entire block (106) must be erased in one shot. A NAND block (106) starts from an erased or empty state; subsequently, it is in the open state as data is written to it; when all the pages are written, the block is said to be in the closed or full state.

In one embodiment, a host device incorporating a NAND storage device sees the storage area organized into logical blocks, which may in some instances bear no relation to NAND blocks, and addressed by logical block addresses (LBAs). Throughout this specification, logical blocks are sometimes referred to as sectors. Due to the restrictions on writing/erasing the NAND flash, the mapping between LBAs and physical locations in the NAND storage device is dynamic. This mapping is often stored in a table called the LBA table and the part of the controller that manages it is called the flash translation layer (FTL). In one embodiment, memory controller (102) is coupled to a DRAM controller (110) for faster storage/execution of instructions.

In one embodiment, when a logical sector is re-written, data is written to a new page in an empty or open block, and the LBA table is updated. The physical location containing the older version of the data is unmapped from the LBA table and the corresponding NAND block is said to have one less valid LBA and/or sector. Without loss of generality, a simple case is described throughout this specification that the size of a NAND page is equal to the size of a sector, but any person having ordinary skill in the art can expand the techniques disclosed to the case where the sector size and the page size are different.

In one embodiment, as the host keeps writing data to the storage device, the number of empty blocks in the storage device reduces. The host may over-write some of the sectors over time, in which case the closed blocks may have fewer and fewer valid pages. Eventually, the storage device must create new erased blocks by moving valid pages from a set of closed blocks to a newly opened block and erasing those closed blocks. This process is called garbage collection (GC). A garbage collector (103) may be incorporated within the memory controller (102) as shown in FIG. 1, or without loss of generality may be in a separate and/or different module.

Scheduling GC appropriately so that throughput for host writes is not affected drastically is disclosed. In one embodiment, host writes are interleaved with GC writes as evenly as possible such that the system does not run out of empty blocks, but also does not throttle host writes more than necessary. Maintaining a high average throughput with minimum fluctuations for host writes is an important goal of NAND flash management. Interleaving GC writes with host writes is disclosed.

Garbage Collection.

In a flash storage device, valid pages are moved from a source location to a new destination location for two main reasons. The first reason is when the number of valid pages in the source block is very low, which relates to garbage collection. The second reason is when the number of program/erase ("PIE") cycles of the block is very low compared to that of the other blocks, which relates to wear-leveling. Throughout this specification a "source location" may include a source block, a source superblock, or any other source location. Throughout this specification a "destination location" may include a destination block, a destination superblock, or any other destination location.

Throughout this specification and without limitation, a scheduling technique disclosed does not differentiate between these two kinds of source blocks, and the general process is referred to as "garbage collection".

Write Amplification.

Write amplification (WA) is defined as the ratio of the total number of writes to the NAND to the number of host writes. For example, if the host writes 1 LBA to the SSD and in the process caused garbage collection to conduct 1 extra write, the WA would be 2. Reducing write amplification is another important goal of NAND flash management.

Figure 2:
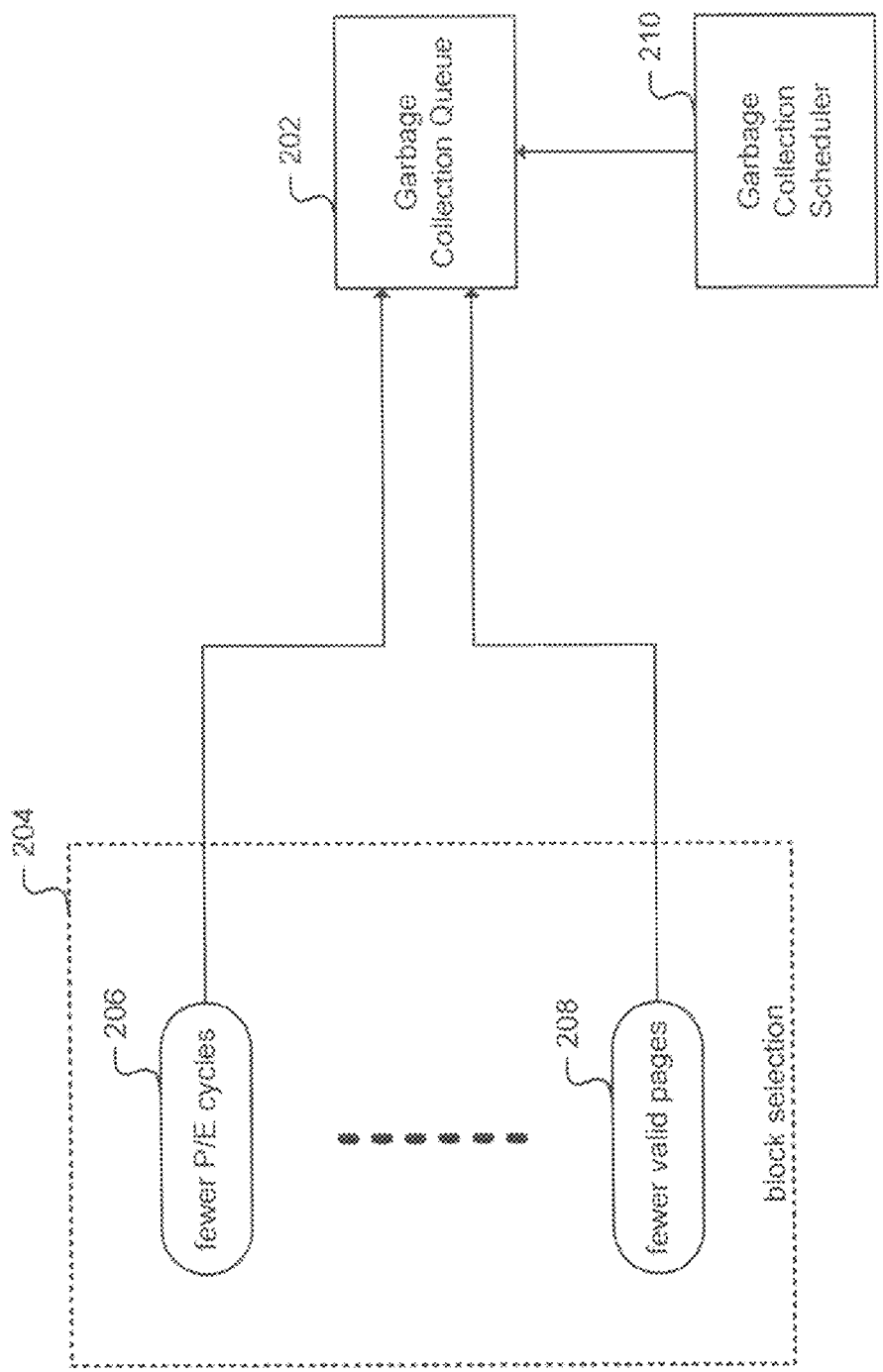
FIG. 2 is an illustration of garbage collection.

FIG. 2 is an illustration of garbage collection. In one embodiment, a queue of source blocks (202) that must be garbage collected is established and termed the "garbage collection queue". The queue (202) is fed by one or more block selection units (204) which select blocks based on a set of criteria. The example shown includes criteria related to a number of P/E cycles (206) and a number of valid pages (208). For example (206) may be related to wear-leveling and flag based on P/E cycles.

Once selected, source blocks are added to the tail of the queue (202). At the other end of the queue (202), a garbage collection scheduler (210) garbage collects starting with the block at the head of the queue.

For the purposes of illustration and without loss of generality or limitation, throughout this specification the case where the on-device volatile cache is used to cache data before being written is assumed. Any person having ordinary skill in the art would understand the disclosed techniques may be applied in alternate cases. For the purposes of illustration and without loss of generality or limitation, it is also assumed that data is written in stripes using a superblock structure, and the terms "block" and "superblock" are used interchangeably.

In one embodiment, the speed of garbage collection is expressed as a ratio of the number of host-write stripes to the number of GC-write stripes. In some use cases, the solid state drive ("SSD") has two or more open blocks—at least one for writing host data and at least another for writing GC data. For the purposes of illustration and without loss of generality or limitation, throughout this specification this use case is assumed.

Look-Ahead is Disclosed.

A fundamental concept behind a look-ahead GC technique is that the GC scheduler (210) looks ahead at the anticipated amount of freed up storage of source blocks in the GC queue. Throughout this specification "anticipated amount of freed up storage" includes any value of storage freed up by garbage collection anticipated at any time. An example of "anticipated amount of freed up storage" is the total number of available pages in all the source blocks in the GC queue. Using this information, the scheduler (210) calculates the speed of GC that will guarantee a minimum number of free pages in the drive in the near future.

An Illustrative Relationship.

Let f be the sum of the number of free pages in the current host open block and the total number of pages in all the empty blocks in the drive. That is, if the current host open block has h pages left unwritten, and there are $b_f$ erased blocks available in the device, wherein P is the number of pages available in a block and/or superblock, then $$f = h + b_f P \qquad (1)$$

The value of f is an indication of the number of free pages available for host writes in the drive. However, note that f does not include the number of free pages in the GC open block. Let c be the minimum number of free pages guaranteed by an example look-ahead GC technique. That is, at any point in time, a technique maintains $$f \geq c \qquad (2)$$

Table Update Techniques.

In a typical SSD implementation, there are multiple LBA table update techniques to select from. The SSD manufacturer may select an LBA table update technique based on the requirements of the application or the customer.

A straightforward first table update technique is one where updating of an LBA table entry for a valid page in a GC source block is done as soon as that page is moved to the GC destination block, and the source block is erased immediately after all the valid pages have been moved. However, this method may cause problems when recovering from power interruptions.

A second table update technique is a "delayed update" technique that delays updating of the LBA table and the erasure of a GC source block, which may be advantageous in some cases. For example, if a table update is delayed until a GC destination block is closed, a shorter recovery time after a sudden power loss may be possible. This second table update technique can also guarantee data integrity for the data being collected. That is, when a sudden power loss happens, the data being written in the open block are not guaranteed to be recovered correctly. With delayed erase, the system can use the data in the source blocks after sudden power loss, which are still available.

The method to calculate GC speed may depend substantively on the table update technique. Throughout this specification and without loss of generality or limitation, the delayed update technique is detailed as it may be more relevant to real-world applications. Any person having ordinary skill in the art will understand that the garbage collection techniques may be extended simply to that of the first table update technique and/or other techniques.

In the delayed update technique, the LBA table is updated whenever a GC destination block is closed. A list of blocks that have been garbage collected but are pending erase is maintained. Whenever GC is finished on a source block, it is added to this list. The blocks in this list are erased whenever a GC destination block is closed.

Figure 3:
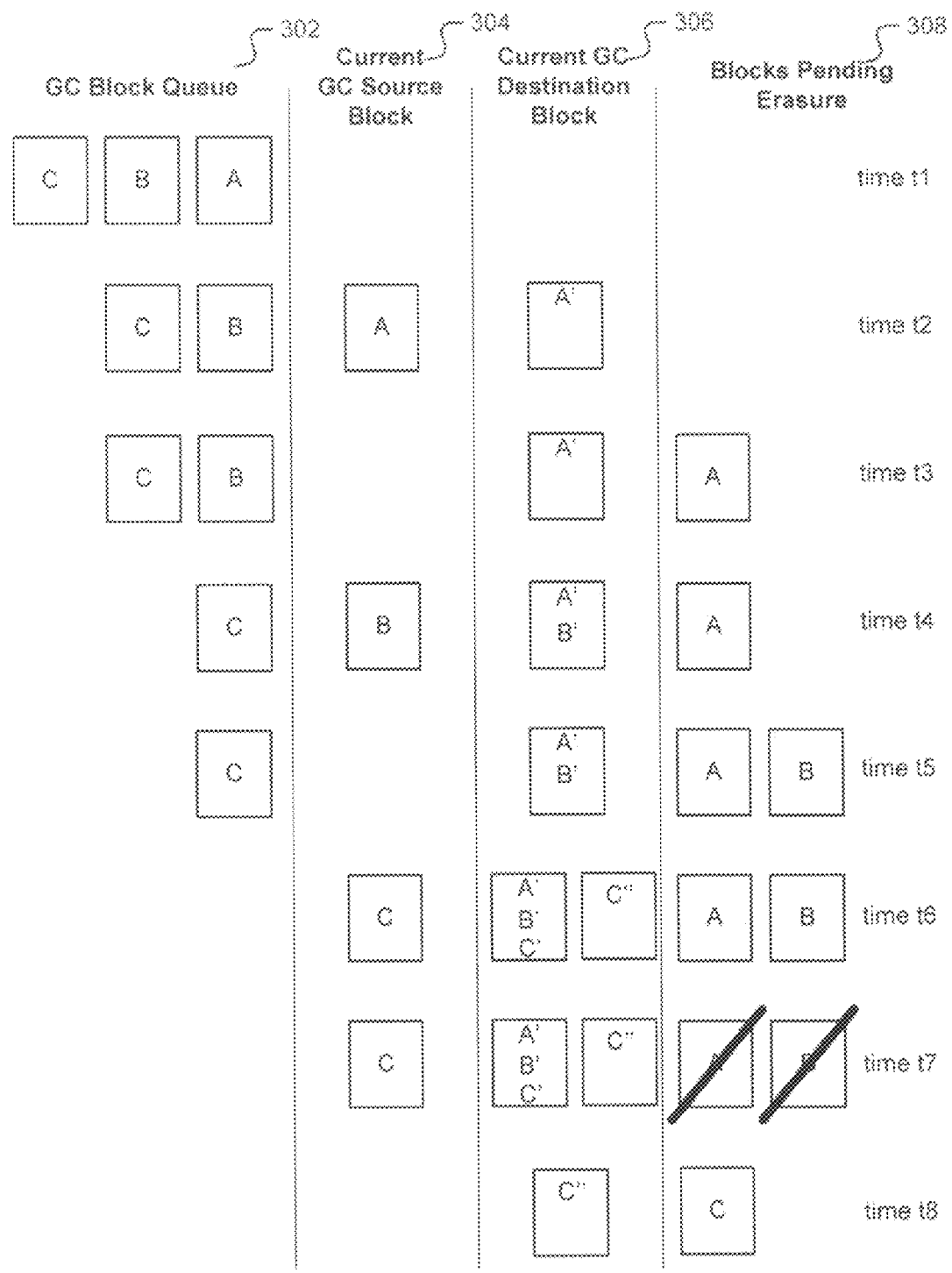
FIG. 3 is an illustrative timeline of garbage collection with delayed update.

FIG. 3 is an illustrative timeline of garbage collection with delayed update. FIG. 3 indicates a timeline at eight different times from t1 through t8 and illustrates what is in the (202) GC block queue (302), the current GC source block for operation (304), the current GC destination block for operation (306) and shows blocks pending erasure but have not yet been erased (308). In one embodiment, the timeline of FIG. 3 is impelled by garbage collector (103), garbage collection scheduler (210), and/or controller (102).

At time t1, there are three blocks that have been placed in the GC block queue (202), marked by the data they carry, in order: at the head of the queue A with horizontal shading, B with vertical shading, and C with diagonal shading at the tail of the queue. Not shown in FIG. 3 is that blocks in queue (202) may only have a small number of valid pages as described above, so that the data from a plurality of source blocks may be garbage collected into a single destination block. The blocks with data A, B, C have been selected by the block selection operation (204) for various reasons, for example, (206) and/or (208).

At time t2, block with data A is popped off the head of queue (202) and processed. The valid pages of A are copied over to the current GC destination block and marked as A' for illustrative purposes with horizontal shading. At time t3, the block with data A is marked for pending erasure, but not yet erased as the current GC destination block is not fully closed.

At time t4, block with data B is popped off the head of queue (202) and processed. The valid pages of B are copied over to the current GC destination block and marked as B' for illustrative purposes with vertical shading. At time t5, the block with data B is marked for pending erasure, but not yet erased as the current GC destination block is not fully closed.

At time t6, block with data C is popped off the head of queue (202) and processed. The valid pages of C are copied over to the current GC destination block and marked as C' for illustrative purposes with diagonal shading. As shown in FIG. 3, not all the valid pages of C are needed to fill the current GC destination block and the leftover valid pages are moved to the next GC destination block and are marked as C".

At time t7, because the GC destination block with A' and B' is already full and is therefore closed, the blocks with data A and data B are erased, shown by the thick diagonal line. At time t8, the block with data C is marked for pending erasure, but not yet erased as the current GC destination block with leftover data C" is not yet closed.

A look-ahead metric. An example look-ahead metric is disclosed as an example of relating the number of valid pages of the source blocks in the GC queue to determine a speed of GC.

Let $n_1, n_2, \ldots$ be the number of GC source blocks erased at the completion/closing of the current GC destination block (306), the next GC destination block and so on. (For example, $n_1=2$ at t7 in FIG. 3.) Let $n_0=0$. Also, let $s_i$ be such that:

$$s_i = \sum_{j=0}^{i} n_j \quad (3)$$

Let $p_1, p_2, p_3, \ldots$ be the number of valid pages in the current GC source block (304) and the subsequent blocks in the GC queue (302). Let d be the number of written pages in the current GC destination block (306). Let a be the speed of GC, as calculated by the scheduler (210). Let $b_p$ be the number of former GC source blocks currently pending erasure (308).

Thus $s_i$ and $n_i$ may be calculated using the values of $p_i$, P, $b_p$ and d with expressions $$s_i \geq b_p + \min\left\{ j : \sum_{k=1}^{j} p_k \geq (P - d + (i-1)P) \right\} \quad (4)$$

$$n_i = s_i - s_{i-1} \quad (5)$$

Another way to describe the relationship in equation (4) above is that $s_i$ counts the total number of GC source blocks needed to fill up i GC destination blocks, and can be broken into two parts:

$b_p$ is the number of GC source blocks used to fill up d pages in the current GC destination block (306); and the min{ } expression in equation (4) determines the number of GC source blocks needed to fill up the remaining pages in the current GC destination block, which is P–d pages, and subsequent (i–1) GC destination blocks, which is (i–1) P pages. The summation term "tries" different values of $j=1, 2, 3, 4, \ldots$ such that the min{ } returns the smallest j that satisfies the inequality. Another way to express this is that it determines the fewest number of GC source blocks needed to fill up the remaining pages in the current GC destination block and subsequent (i–1) destination blocks. The second ≥ sign expresses there may be pages left in the jth GC source block, which could be used to fill the (i+1)th GC destination block.

In these above equations, an assumption is made that the number of valid pages in the queued GC source blocks remains unchanging with time. This is a pessimistic assumption because the subsequent host writes may invalidate some of the pages in those blocks, meaning there will be equal or more blocks to be freed up, indicated by the 1st ≥ sign in equation (4).

In one method to calculate the GC speed, a fact is noted that f is the smallest just before a GC destination block is closed. The GC speed α may mean the controller (102) does a stripes of GC writes for every one host write. Since the current GC destination block has d written pages already, at the end of the current destination block, (P–d)/α host pages may have been written. Therefore, the number of free pages available at the end of the current GC destination block is:

$$f_1' = f - \left(\frac{P-d}{\alpha}\right) \quad (6)$$

In general, just before the $i^{th}$ GC destination block is closed, the number of free pages is $$f_i' = f - \left(\frac{iP-d}{\alpha}\right) + (s_{i-1} - (i-1))P \quad (7)$$

Here, the term (i–1)P refers to the number of free pages removed by opening (i–1) new GC destination blocks, and the term $s_{i-1}P$ corresponds to the number of free pages added by erasing the pending GC source blocks.

In this example, the GC speed at any point in time is chosen as the least value of a that makes sure that $f_i' \geq c$ for all values of i from 1 to k, where the parameter k is the maximum number of future GC destination blocks looked ahead. Since our method looks at the number of free pages available from now until right before the closing of the kth GC destination block into the future, it is termed the "look-ahead garbage collection" technique.

The above expressions may be rearranged such that the look-ahead GC technique determines speed α as $$\alpha \geq \frac{iP - d}{f - c + (s_{i-1} - (i-1))P}, 1 \leq i \leq k \quad (8)$$

Or put alternately, $$\alpha = \max\left\{\frac{iP - d}{f - c + (s_{i-1} - (i-1))P}, 1 \leq i \leq k\right\} \quad (9)$$

In this equation, one heuristic is to replace $s_i$ by equation (4) using the equal sign. That is, a smaller $s_i$ than the true value may be used in equation (9). This may lead to an overestimate of α, which means more pages than necessary may be garbage collected to maintain the number of free pages guaranteed. As a result, WA may be higher. In summary, the above system of expressions provides a look-ahead metric for a look-ahead garbage collection technique.

Integer Ratios for the GC Speed.

In equation (9), the value of α is calculated with arbitrary precision. In a practical implementation, only rational values to α of the form m/n may be set, where n is a positive integer value below a prescribed upper bound. This is because it is preferable to write only an integer number of stripes. For example, the firmware may prefer to do m stripes of GC writes for every n host writes. Therefore, the fraction m/n is selected that is closest to α and not less than α. This guarantees that the GC speed is at least as fast as required while still being an easily representable fraction.

Thus, a quantization technique includes ensuring α is a rational number, wherein throughout this specification a "rational number" is any number that can be expressed as the quotient or fraction p/q of two integers, p and q, with the denominator q not equal to zero. Since q may be equal to 1, every integer is a rational number. Because the rational number is selected wherein it is not less than the arbitrary precision number calculated in equation (9), a ceiling function may be used such that ceiling function "ceil" may be expressed as ceil(x) is the smallest integer not less than x.

Choosing the c Parameter: The Minimum Number of Guaranteed Free Pages.

The minimum number of guaranteed free pages c may be slightly more than one full block, that is, c>P. At least one full block is advantageous to ensure that at any point in time a new GC destination block may be opened. In one embodiment, the pending blocks may not be erased until the new GC destination block is opened. Constraining c>P will assist those cases as well.

Choosing the k Parameter: The Look-Ahead Parameter.

The value of k, which is the number of future GC destination blocks to which the technique looks-ahead, is important.

Simulations may be one method to select k. Simulations show that when the value of k is very small, the scheduler fails to meet the f>c guarantee. This may be because the scheduler (210) is unable to correctly predict situations where GC must be done faster than required. This may happen in scenarios where $s_i = i$ for all $i \leq k$. Under this situation, the scheduler guarantees f>c up to the $k^{th}$ block, and the guarantee fails at the beginning of the $(k+1)^{th}$ block. As an example, in a simulation where a full-drive sequential write was used followed by a full-drive random write, the drive ran out of free blocks when k was less than 4.

FIGS. 4A, 4B, 4C, and 4D are simulation plots as a function of the look-ahead parameter. In the following plots, k is varied and the values of f and α are plotted, wherein the value of α is the quantized version described above.

Figure 4A:
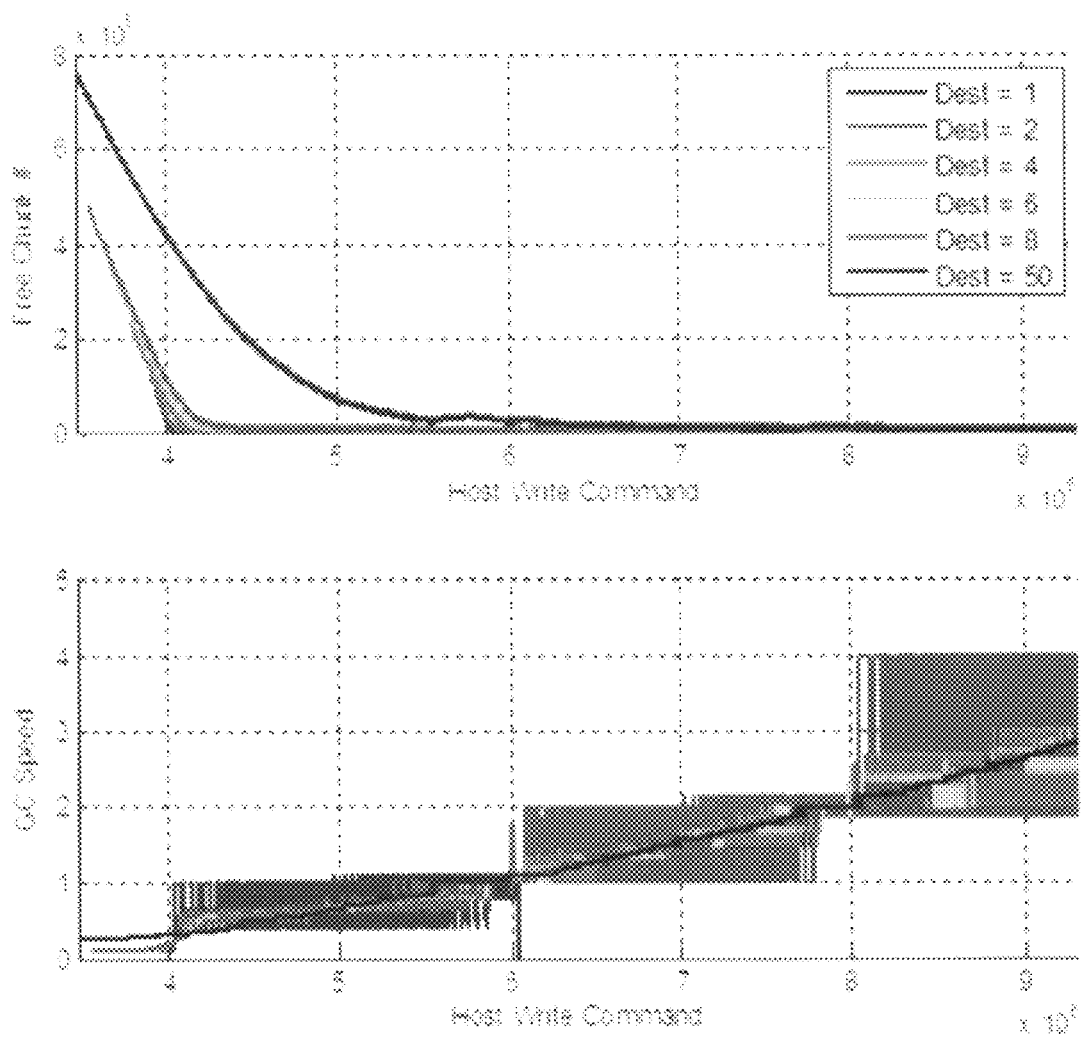
FIGS. 4A, 4B, 4C, and 4D are simulation plots as a function of the look-ahead parameter.

In FIG. 4A, k, termed "Dest", is varied from k=1, 2, 4, 6, 8, and 50. The x-axis depicts the number of Host Write Commands in simulation over time from 0 to 9E6, and the top y-axis depicts f, also termed "Free Chunk #", from 0 to 8E5, and the bottom y-axis depicts α, a quantized GC speed, from 1 to 5. Part of FIG. 4A depicts that with k=1, after 6E6 host write commands the system fails to meet the f>c guarantee.

Figure 4B:
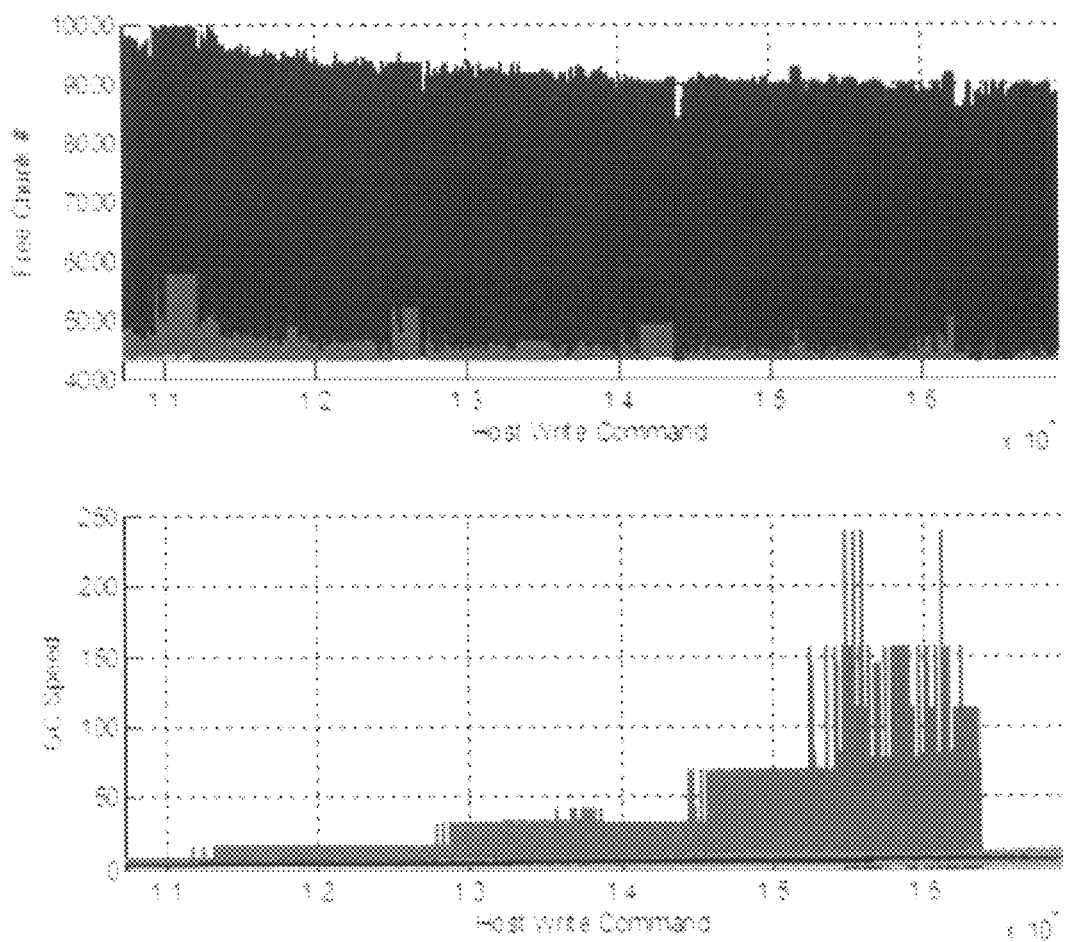

FIG. 4B is a continuation of FIG. 4A at a future time with more completed Host Write Commands from 1.1E7 to 1.6E7, using the same key for k as in FIG. 4A. As can be shown by the ballooning a for k=2, the bottom graph in FIG. 4B shows the system fails with k=2.

Figure 4C:
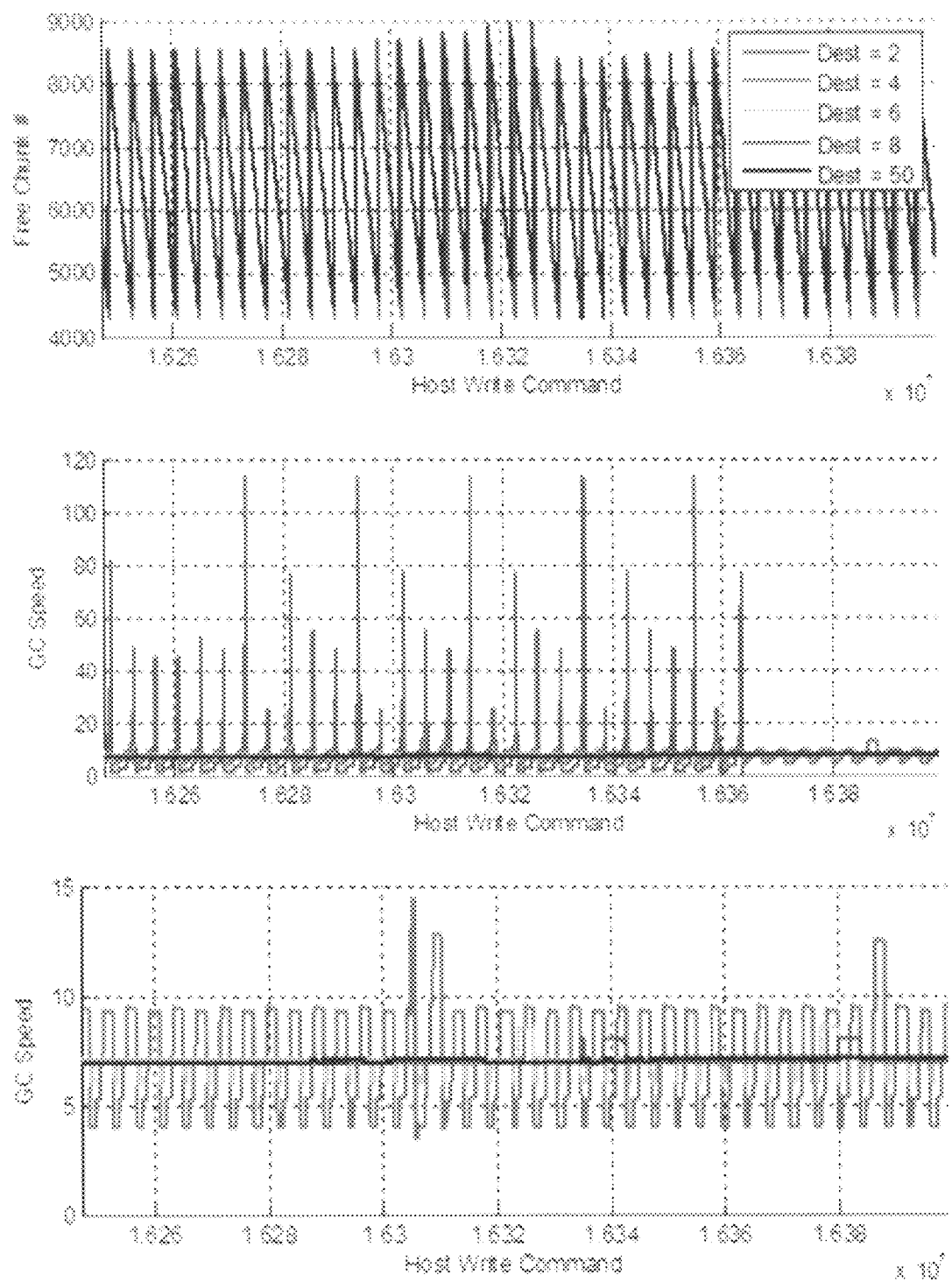

FIG. 4C is an x-axis 'zoom-in' of FIG. 4B that more clearly demonstrates that the system fails with k=2. The top graph depicts f vs the number of Host Write Commands between 1.626E7 and 1.638E7. The middle graph depicts α for the same x-axis, and at or around 1.636E7 host write commands the k=2 system fails to meet the f>c guarantee. The bottom graph shows a further y-axis zoom-in of the middle graph that demonstrates that k=4, 6, 8, and 50 still meet the guarantee.

Figure 4D:
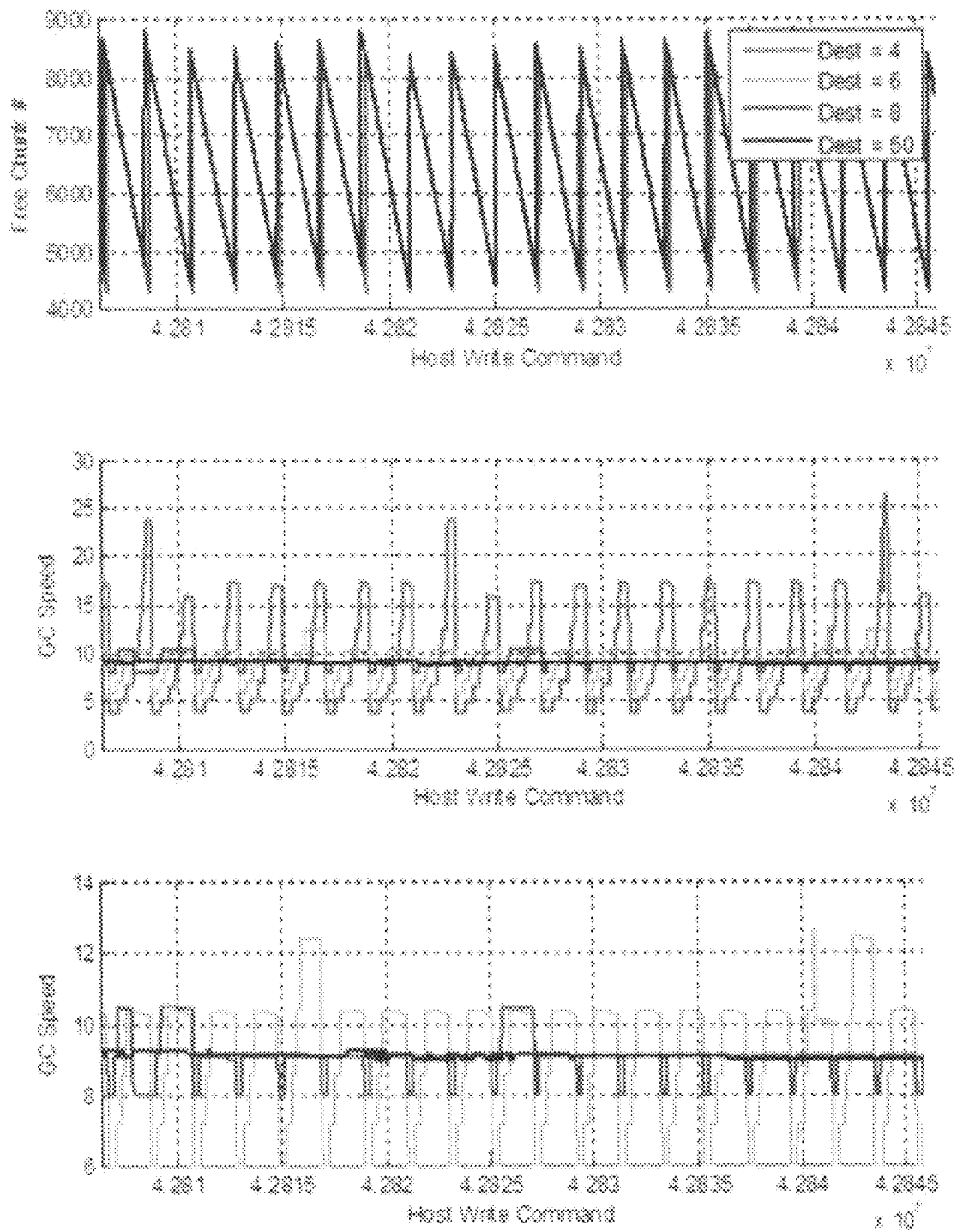

FIG. 4D is a continuation of FIG. 4A at a further future time with more completed Host Write Commands 4.281E7 to 4.2845E7. For the top graph depicting f and for the middle graph and bottom graph depicting a for the same x-axis, setting k at or above 4 appears stable.

One assessment from FIGS. 4A, 4B, 4C, and 4D is that a large value of k will look-ahead far into the future, where things may not be as accurate. Specifically, note that $p_i$ is the number of valid pages in the $i^{th}$ GC source block. When this block is eventually garbage collected, the number of valid pages in it may end up being much smaller than $p_i$; this happens if the host overwrites some of its sectors between now and the time when it is actually garbage collected. This may result in a pessimistic GC speed overestimate and a slight increase in WA for certain workloads.

One advantage of using large values of k is that GC speed does not fluctuate rapidly over a short amount of time. This may be quite important in cases where we want to guarantee quality of service. Certain applications demand uniform write latencies as against highly varying write latencies. In such applications a large k will be helpful.

Updating GC Speed.

Calculating GC speed or α, as for example shown in equation (9) above, uses computation resources which may be limited in an SSD controller (102). Therefore, heuristics or other determinations may indicate the GC speed should not be updated more often than necessary. In one embodiment, a simple way to achieve this is to update the speed only after a set number of host writes or when specific points are reached. Thus for example, the scheduler may update the speed every p pages of host writes or after a certain number of GC destination blocks have been filled.

Figure 5:
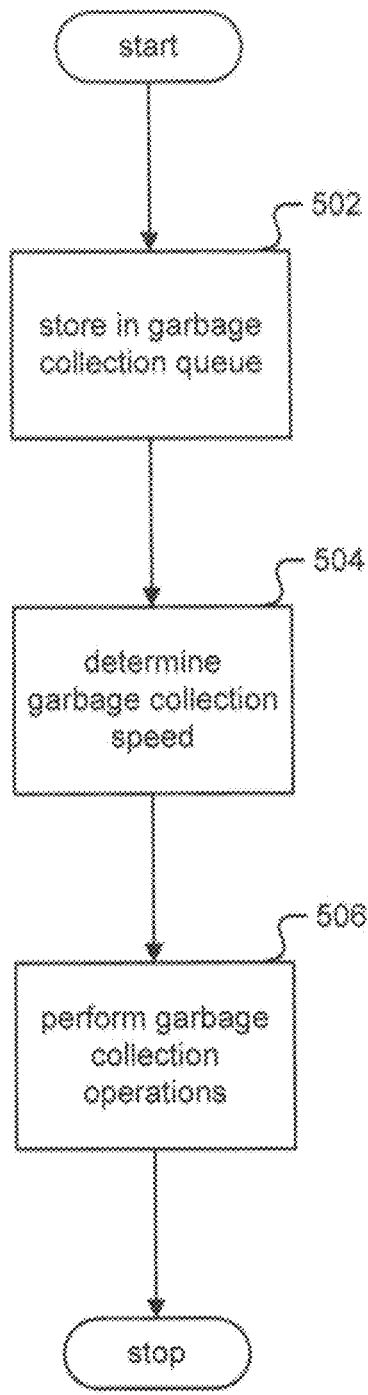
FIG. 5 is a block diagram illustrating an embodiment of look-ahead garbage collection.

FIG. 5 is a block diagram illustrating an embodiment of look-ahead garbage collection. The technique of FIG. 5 may be carried out by controller (102) in FIG. 1.

At step 502, one or more source locations such as source blocks and/or source superblocks are stored in a garbage collection queue (202), as shown in FIG. 3(302). The source locations are part of a group of solid state storage cells (104) on which garbage collection is to be performed. The group of solid state storage cells (104) may be associated with an LBA table update technique. In one embodiment, the LBA table update technique comprises a delayed erase of source blocks.

At step 504, a garbage collection scheduler (210), in some cases as part of garbage collector (103) and/or controller (102), is configured to determine a garbage collection speed. For example, equation (9) may determine α which may further be quantized in one embodiment. In one embodiment, the garbage collection scheduler (210) is configured to update the garbage collection speed periodically. In one embodiment, determining the garbage collection speed includes quantizing it to a rational number. In one embodiment, quantizing includes using a ceiling function.

At step 506, garbage collector (103) performs one or more garbage collection operations interleaved with one or more host operations, wherein the ratio of garbage collection operations to host operations is based at least in part on the garbage collection speed from step 504.

Figure 6:
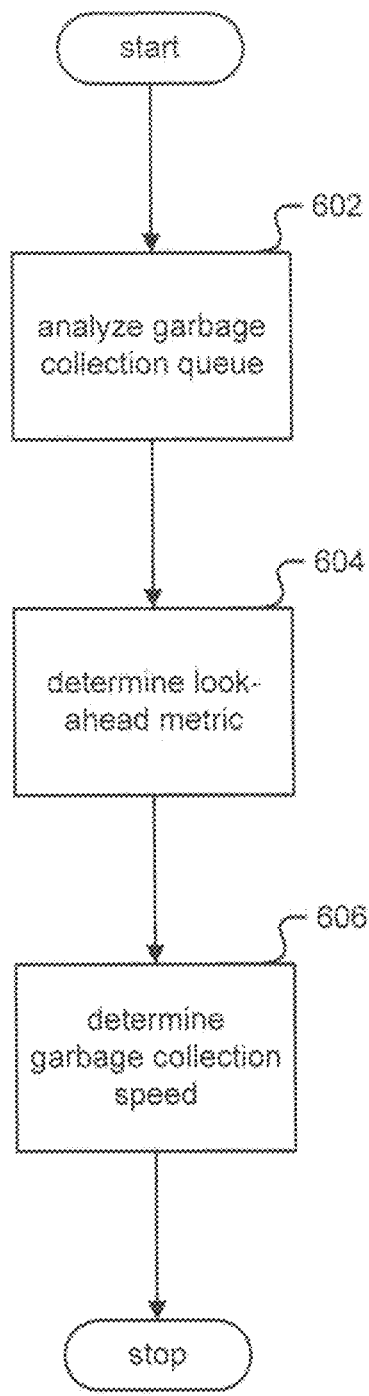
FIG. 6 is a block diagram illustrating an embodiment of determining a garbage collection speed.

FIG. 6 is a block diagram illustrating an embodiment of determining a garbage collection speed. The technique of FIG. 6 may be included in step 504 of FIG. 5.

At step 602, one or more source locations stored in the garbage collection queue (202) are analyzed. At step 604, a look-ahead metric is determined. Throughout this specification, a "look-ahead metric" comprises any measure and/or metric of anticipated amount of freed up storage associated with the analyzed source locations. The relationships expressed, for example, in equations (1) through (7) may express one or more look-ahead metrics.

In one embodiment, determining the look-ahead metric comprises determining a number of valid pages within the analyzed source blocks. In one embodiment, determining the look-ahead metric comprises analyzing one or more anticipated destination locations. In one embodiment, determining the look-ahead metric comprises determining a look-ahead parameter, k, which represents a number of future GC destination blocks to analyze. In one embodiment, determining the look-ahead metric comprises finding a minimum quantity in an expression such as that found in equation (4).

In one embodiment, determining the look-ahead metric comprises determining a sum of free pages in a current host open block and total count of pages in all empty blocks. In one embodiment, determining the look-ahead metric comprises determining a count of available pages in a block or superblock. In one embodiment, determining the look-ahead metric comprises determining a count of written pages in a current destination block. In one embodiment, determining the look-ahead metric comprises determining a minimum count of free pages guaranteed. In one embodiment, determining the look-ahead metric comprises determining a count of former GC source blocks currently pending erasure.

In one embodiment, determining the look-ahead metric comprises determining a count of valid pages in one or more source blocks. In one embodiment, determining the look-ahead metric comprises determining a smallest value that satisfies an inequality. For example, the inequality may comprise a fewest count of source blocks needed to fill up remaining pages in a current destination block and subsequent destination blocks. At step 606, the garbage collection speed is determined based at least in part on the look-ahead metric, for example using the expression at equation (9).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a garbage collection queue configured to store one or more source locations, in a group of solid state storage cells on which garbage collection is to be performed;
   a garbage collection scheduler configured to determine a garbage collection speed, including by:
      analyzing one or more source locations stored in the garbage collection queue;
      determining a look-ahead metric, wherein the look-ahead metric comprises an anticipated amount of freed up storage associated with the analyzed source locations; and
      determining the garbage collection speed based at least in part on the look-ahead metric; and
   a garbage collector configured to perform one or more garbage collection operations interleaved with one or more host operations, wherein the ratio of garbage collection operations to host operations is based at least in part on the garbage collection speed.

2. The system as recited in claim 1, wherein a source location is a source block.

3. The system as recited in claim 2, wherein determining the look-ahead metric comprises determining a number of valid pages within the analyzed source blocks.

4. The system as recited in claim 1, wherein determining the look-ahead metric comprises analyzing one or more anticipated destination locations.

5. The system as recited in claim 1, wherein the garbage collection scheduler is further configured to update the garbage collection speed.

6. The system as recited in claim 1, wherein the group of solid state storage cells is associated with an LBA table update technique.

7. The system as recited in claim 6, wherein the LBA table update technique comprises a delayed erase of source blocks.

8. The system as recited in claim 1, wherein determining the look-ahead metric comprises determining a look-ahead parameter comprising a number of destination blocks to analyze.

9. The system as recited in claim 1, wherein determining the look-ahead metric comprises finding a minimum quantity in an expression.

10. The system as recited in claim 1, wherein determining the garbage collection speed further includes quantizing to a rational number.

11. The system as recited in claim 10, wherein quantizing includes using a ceiling function.

12. The system as recited in claim 1, wherein determining the look-ahead metric comprises determining a sum of free pages in a current host open block and total count of pages in all empty blocks.

13. The system as recited in claim 1, wherein determining the look-ahead metric comprises determining a count of available pages in a block or superblock.

14. The system as recited in claim 1, wherein determining the look-ahead metric comprises determining a count of written pages in a current destination block.

15. The system as recited in claim 1, wherein determining the look-ahead metric comprises determining a minimum count of free pages guaranteed.

16. The system as recited in claim 1, wherein determining the look-ahead metric comprises determining a count of former GC source blocks currently pending erasure.

17. The system as recited in claim 1, wherein determining the look-ahead metric comprises determining a count of valid pages in one or more source blocks.

18. The system as recited in claim 1, wherein determining the look-ahead metric comprises determining a smallest value that satisfies an inequality.

19. The system as recited in claim 18, wherein the inequality comprises a fewest count of source blocks needed to fill up remaining pages in a current destination block and subsequent destination blocks.

20. A method, comprising:
- storing in a garbage collection queue one or more source locations in a group of solid state storage cells on which garbage collection is to be performed;
- determining a garbage collection speed, including by:
  - analyzing one or more source locations stored in the garbage collection queue;
  - determining a look-ahead metric, wherein the look-ahead metric comprises an anticipated amount of freed up storage associated with the analyzed source locations; and
  - determining the garbage collection speed based at least in part on the look-ahead metric; and
- performing one or more garbage collection operations interleaved with one or more host operations, wherein the ratio of garbage collection operations to host operations is based at least in part on the garbage collection speed.

* * * * *